(12) United States Patent
Shi et al.

(10) Patent No.: US 9,143,504 B1
(45) Date of Patent: Sep. 22, 2015

(54) SECURE COMMUNICATION INFRASTRUCTURE

(71) Applicant: EMC Corporation, Hopkinton, MA (US)

(72) Inventors: Mingjiang Shi, Shanghai (CN); Meiling Ge, Shanghai (CN); Tianming Zhang, Hopkinton, MA (US); Gregory W. Lazar, Upton, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 14/138,848

(22) Filed: Dec. 23, 2013

(51) Int. Cl.
*H04L 29/06* (2006.01)
*G06F 21/32* (2013.01)
*G06F 21/60* (2013.01)

(52) U.S. Cl.
CPC ............ *H04L 63/0823* (2013.01); *G06F 21/32* (2013.01); *G06F 21/606* (2013.01); *H04L 63/0869* (2013.01)

(58) Field of Classification Search
CPC .... G06F 21/32; G06F 21/606; H04L 63/0823
USPC ................. 726/15, 18, 27; 713/156, 168, 176
See application file for complete search history.

(56) References Cited

U.S. PATENT DOCUMENTS

| | | | |
|---|---|---|---|
| 2002/0073310 A1* | 6/2002 | Benantar | 713/156 |
| 2008/0098214 A1* | 4/2008 | Rodriguez Martinez et al. | 713/156 |

OTHER PUBLICATIONS

Cooper, et al., "Internet X.509 Public Key Infrastructure Certificate and Certificate Revocation List (CRL) Profile," RFC 5280, Standards Track, Network Working Group, 201 pps., May 2008.

* cited by examiner

*Primary Examiner* — Dao Ho
(74) *Attorney, Agent, or Firm* — Muirhead and Saturnelli, LLC

(57) ABSTRACT

Described are techniques for using a first secure communication connection between a first component and a second component to establish a second communication connection as another secure communication connection between the components. The first secure communication connection may be used to exchange fingerprints for digital certificates of the two components. The second communication may be used to exchange digital certificates of the two components. Each of the components may determine whether the received fingerprint of the other component matches a calculated fingerprint of the received certificate for the other component, and if so, the received certificate for the other component may be stored in a data store of said each component.

20 Claims, 6 Drawing Sheets

SECURE COMMUNICATION INFRASTRUCTURE

BACKGROUND

1. Technical Field

This application generally relates to secure communication connections.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a data storage system including a plurality of host interface units, disk drives, and disk interface units. The host systems access the data storage system through a plurality of channels provided therewith. Host systems provide data and access control information through the channels and the storage system provides data to the host systems also through the channels. The host systems do not address the disk drives of the storage system directly, but rather, access what appears to the host systems as a plurality of logical disk units. The logical disk units may or may not correspond to the actual disk drives. Allowing multiple host systems to access the single data storage system allows the host systems to share data stored in the storage system. In order to facilitate sharing of the data on the data storage system, additional software on the data storage systems may also be used.

SUMMARY OF THE INVENTION

In accordance with one aspect of the invention is a method for using a first secure communication connection between a first component and a second component to establish a second communication connection as another secure communication connection between the first component and the second component, the method comprising: using the first secure communication connection to send, from the first component to the second component, a first fingerprint of a first digital certificate of the first component, said first fingerprint being stored in a list of fingerprints received by the second component over the first secure communication connection; using the first secure communication connection to send, from the second component to the first component, a second fingerprint of a second digital certificate of the second component, said second fingerprint being stored in another list of fingerprints received by the first component over the first secure communication connection; using the second communication connection to send, from the second component to the first component, the second digital certificate; performing first processing by the first component, the first processing including: determining a calculated fingerprint for the second digital certificate; determining whether the calculated fingerprint matches any fingerprint of the another list of fingerprints previously received by the first component over the first secure communication connection; and if it is determined that the calculated fingerprint matches a fingerprint of the another list, storing the second digital certificate in a first data store for used by the first component; using the second communication connection to send, from the first component to the second component, the first digital certificate; and performing second processing by the second component, the second processing including: determining another calculated fingerprint for the first digital certificate; determining whether the another calculated fingerprint matches a fingerprint of the list of fingerprints previously received by the second component over the first secure communication connection; and if it is determined that the another calculated fingerprint matches a fingerprint of the list, storing the first digital certificate in a second data store for used by the second component. The first component may be any of a host and agent of the host, and the second component may be a data storage system. The first secure communication connection may be an in band communication connection of a data path for transmitting I/O requests from the host to the data storage system and for providing requested host data that is stored on the data storage system to the host. The second communication connection may be an out of band communication connection of a management path used for management requests between the host and the data storage system. After completing said first processing and said second processing, the second communication connection may be used as the another secure communication connection to exchange information between the first component and the second component. After completing said first processing and said second processing, third processing may be performed that includes sending a request for first data from the first component to the second component; performing mutual authentication processing that includes verifying, by the second component using the second data store, the first digital certificate of the first component and includes verifying, by the first component using the first data store, the second digital certificate of the second component; determining, using access information associated with the second digital certificate, whether the request for first data by the first component is allowable; and responsive to determining that the request for first data is allowable, providing, by the second component to the first component, the first data requested. The first data may be provided to the first component in an encrypted form.

In accordance with another aspect of the invention is a computer readable medium comprising code stored thereon for using a first secure communication connection between a first component and a second component to establish a second communication connection as another secure communication connection between the first component and the second component, the computer readable medium comprising code stored thereon for: using the first secure communication connection to send, from the first component to the second component, a first fingerprint of a first digital certificate of the first component, said first fingerprint being stored in a list of fingerprints received by the second component over the first secure communication connection; using the first secure communication connection to send, from the second component to the first component, a second fingerprint of a second digital certificate of the second component, said second fingerprint being stored in another list of fingerprints received by the first component over the first secure communication connection; using the second communication connection to send, from the second component to the first component, the second digital certificate; performing first processing by the first component, the first processing including: determining a calculated fingerprint for the second digital certificate; determining whether the calculated fingerprint matches any fingerprint of the another list of fingerprints previously received by the first component over the first secure communication connection; and if it is determined that the calculated fingerprint matches a fingerprint of the another list, storing the second digital certificate in a first data store for used by the first component; using the second communication connection to send, from the first component to the second component, the first digital certificate; and performing second processing by the second component, the second processing including: determining another calculated fingerprint for the first digital certificate; determining whether the another calculated fingerprint matches a fingerprint of the list of fingerprints previously received by the second component over the first secure communication connection; and if it is determined that the another calculated fingerprint matches a fingerprint of the list, storing the first digital certificate in a second data store for used by the second component. The first component may be any of a host and agent of the host, and the second component is a data storage system. The first secure communication connection may be an in band communication connection of a data path for transmitting I/O requests from the host to the data storage system and for providing requested host data that is stored on the data storage system to the host. The second communication connection may be an out of band communication connection of a management path used for management requests between the host and the data storage system. The computer readable medium may further comprise code that, after completing said first processing and said second processing, uses the second communication connection as the another secure communication connection to exchange information between the first component and the second component. The computer readable medium may further comprise code that performs third processing after said first processing and said second processing have completed. The code that performs third processing may include code for: sending a request for first data from the first component to the second component; performing mutual authentication processing that includes verifying, by the second component using the second data store, the first digital certificate of the first component and includes verifying, by the first component using the first data store, the second digital certificate of the second component; determining, using access information associated with the second digital certificate, whether the request for first data by the first component is allowable; and responsive to determining that the request for first data is allowable, providing, by the second component to the first component, the first data requested. The first data may be provided to the first component in an encrypted form.

In accordance with another aspect of the invention is a method for secure communication comprising: providing a first communication connection between a first component and a second component, said first communication connection being a first secure communication connection providing for securely exchanging information between the first component and the second component, said first component having a first digital certificate with a first fingerprint, said second component having a second digital certificate with a second fingerprint; performing first processing to establish a second communication connection as a second secure communication connection between the first component and the second component, said first processing including: sending, by the second component to the first component over the first communication connection, the second fingerprint, wherein said first component stores the second fingerprint in a first list of fingerprints received by the first component over the first communication connection; sending, by the first component to the second component over the first communication connection, the first fingerprint wherein said second component stores the first fingerprint in a second list of fingerprints received by the second component over the first communication connection; sending, by the second component to the first component over the second communication connection, the second digital certificate; calculating, by the first component using the second digital certificate received, a a calculated fingerprint; determining, by the first component, whether the calculated fingerprint matches any fingerprint in the first list; responsive to determining the calculated fingerprint matches a fingerprint in the first list, storing the second digital certificate in a first data store for use by the first component; sending, by the first component to the second component over the second communication connection, the first digital certificate; calculating, by the second component using the first digital certificate received, a another calculated fingerprint; determining, by the second component, whether the another calculated fingerprint matches any fingerprint in the second list; and responsive to determining the another calculated fingerprint matches a fingerprint in the second list, storing the first digital certificate in a second data store for use by the second component. Prior to performing said first processing, said second communication connection may be characterized as providing a lower level of security, in connection with exchanging information between the first component and the second component, than said first communication connection. The first component may be any of a host and agent of the host, and the second component is a data storage system. The first communication connection may be an in band communication connection of a data path for transmitting I/O requests from the host to the data storage system and for providing requested host data that is stored on the data storage system to the host. The second communication connection may be an out of band communication connection of a management path used for management requests between the host and the data storage system. After completing said first processing, the second communication connection may be used as another secure communication connection to exchange information between the first component and the second component.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
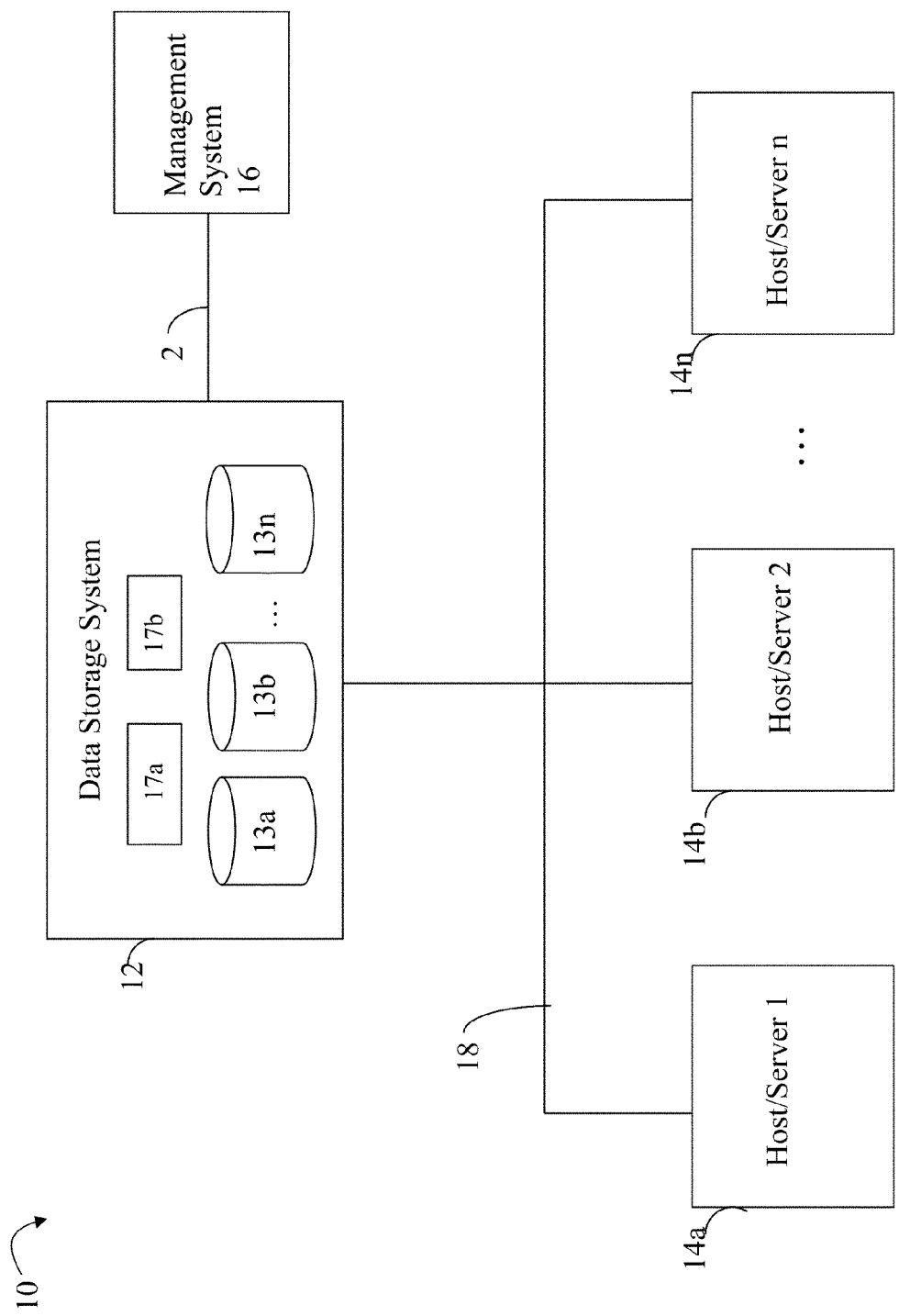
FIG. 1 is an example of an embodiments of a system that may utilize the techniques described herein.

Referring to FIG. 1, shown is an example of an embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 2. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 2 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the system 10. In one embodiment, the communication medium 2 may be a LAN connection and the communication medium 18 may be an iSCSI or Fibre Channel connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 2 by any one of variety of connections in accordance with the type of communication medium 2. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 2, a variety of different communication protocols may be used such as SCSI, Fibre Channel, iSCSI, and the like. Some or all of the connections by which the hosts, management system, and data storage system may be connected to their respective communication medium may pass through other communication devices, such as switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the data storage systems 12 may include one or more data storage systems such as one or more of the data storage systems, such as data storage arrays, offered by EMC Corporation of Hopkinton, Mass. Each of the data storage systems may include one or more data storage devices 13a-13n, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes 13a-13n. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems and management system 16 may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

The data storage system may be a single unitary data storage system, such as single data storage array, including two storage processors (SPs) or computer processing units. Techniques herein may be more generally use in connection with any one or more data storage system each including a different number of service processors than as illustrated herein. The data storage system 12 may be a data storage array, such as a VNX™ data storage array by EMC Corporation of Hopkinton, Mass., including a plurality of data storage devices 13a-13n and two service or storage processors 17a, 17b. The service processors 17a, 17b may be computer processing units included in the data storage system for processing requests and commands. In connection with performing techniques herein, an embodiment of the data storage system may include multiple service processors including more than two service processors as described. The VNX™ data storage system mentioned above may include two service processors 17a, 17b for performing processing in connection with servicing requests. Additionally, the two service processors 17a, 17b may be used in connection with failover processing when communicating with the management system 16. Client software on the management system 16 may be used in connection with performing data storage system management by issuing commands to the data storage system 12 and/or receiving responses from the data storage system 12 over connection 2. In one embodiment, the management system 16 may be a laptop or desktop computer system.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Figure 2:
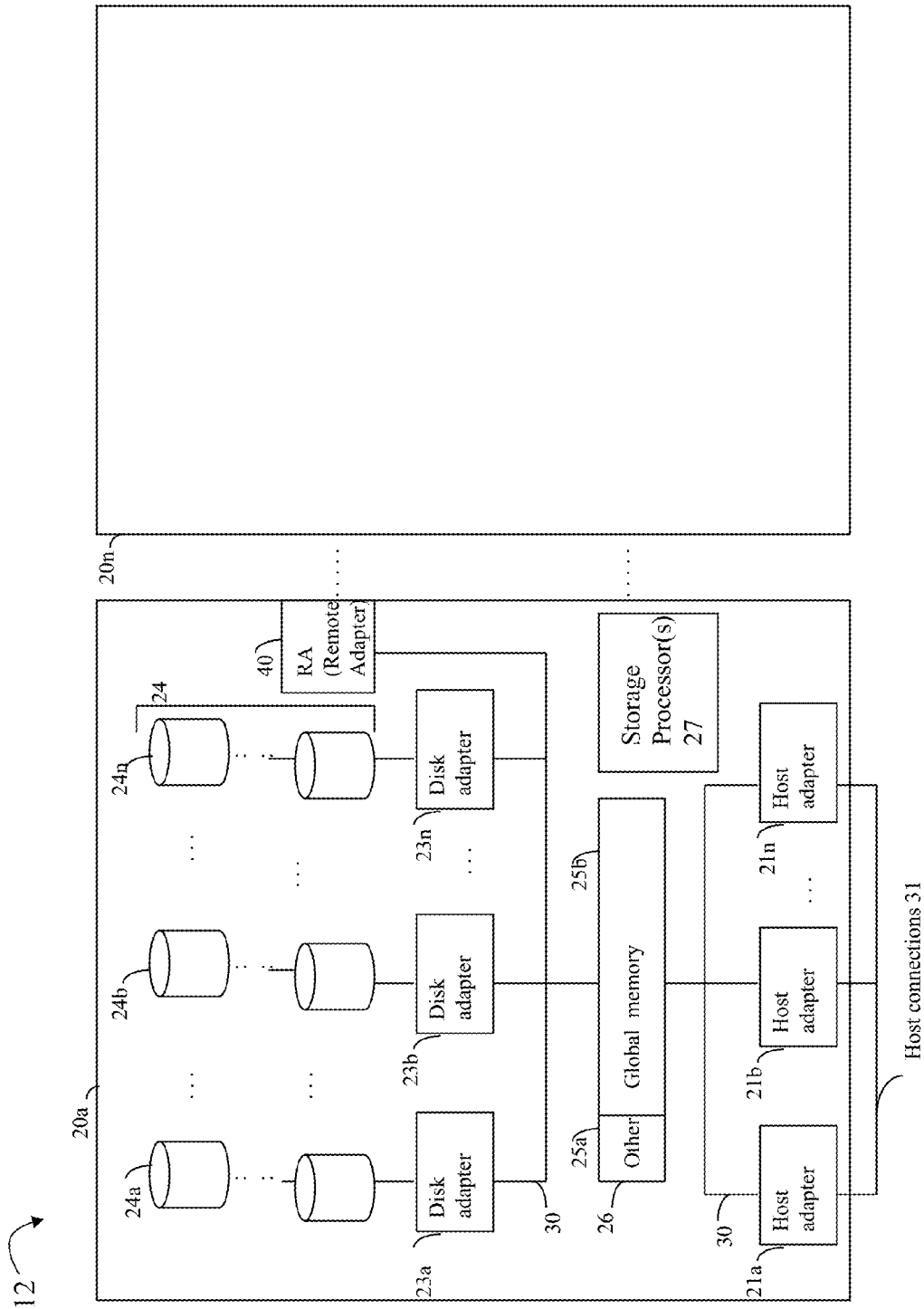
FIG. 2 is an example illustrating details of a data storage system in accordance with techniques herein.

Referring to FIG. 2, shown is an example of an embodiment of the data storage system 12 that may be included in the system 10 of FIG. 1. Included in the data storage system 12 of FIG. 2 are one or more data storage systems 20a-20n as may be manufactured by one or more different vendors. Each of the data storage systems 20a-20n may be a data storage array inter-connected (not shown) to other data storage array(s). Additionally, as noted above, the data storage systems may also be connected to the host systems through any one or more communication connections 31. In this example as described in more detail in following paragraphs, reference is made to the more detailed view of element 20a. It should be noted that a similar more detailed description may also apply to any one or more of the other elements, such as 20n, but have been omitted for simplicity of explanation.

Each of the data storage systems, such as 20a, may include a plurality of storage devices such as disk devices or volumes included in an arrangement 24 consisting of n rows of disks or more generally, data storage devices, 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system such as by EMC Corporation, a backend DA may also be referred to as a disk controller. The DA may performed operations such as reading data from, and writing data to, the physical devices which are serviced by the DA.

Also shown in the storage system 20a is an RA or remote adapter 40. The RA may be hardware including a processor used to facilitate communication between data storage systems, such as between two of the same or different types of data storage systems.

The system 20a may also include one or more storage processors 27. Each of the storage processors 27 may be CPU and an embodiment may include any number of such processors. For example, the VNX™ data storage system by EMC Corporation includes two storage processors. The system 20a may also include one or more host adapters ("HAs") or directors 21a-21n. Each of the HAs may be used to manage communications and data operations between one or more host systems and the global memory. In an embodiment, the HA may be a Fibre Channel Adapter (FA) or other adapter which facilitates host communication. The HA communicates with a component of the host such as a host bus adapter (HBA). Generally, directors may also be characterized as the different adapters, such as HAs (including FAs), DAs RAs and the like, as described herein. Components of the data storage system, such as an HA, which may communicate with a host may also be referred to as front end components. Within the data storage system, components, which may be characterized as backend components, communicate with a front end component. An example of a backend component is a DA. In connection with data storage systems such as by EMC Corporation, various types of directors or adapters may be implemented as a processor, or, more generally, a component that includes the processor. Examples of directors are disk adapters (DAs), host adapters (HAs), and the like.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

In general, a storage area network (SAN) may be characterized as a collection of data storage systems that are networked together via a switching fabric to a number of host computer systems operating as servers such as illustrated in FIG. 1.

In some systems, the data storage system may acquire information from each of one or more hosts describing aspects of how each host uses storage of the data storage system. Such information may be useful, for example, in connection with performing processing to optimize data accesses (e.g., I/O requests) from the particular hosts. In order for a data storage system to obtain such information from a host, a host may have software executing thereon, such as a host agent, which may gather and report requested information to the data storage system.

Described in following paragraphs are techniques that may be used to establish a secure communications infrastructure between a host and a data storage system, such as a data storage array. The communication connections or channels established may be used in connection with the host agent providing the requested information to the data storage system. Although following paragraphs may refer to a particular example in connection with the host agent, more generally, the communication connections or channels may be used in connection with exchanging any desired information that may be provided by the host to the data storage system, and/or information provided by the data storage system to the host. Even more generally, such techniques described herein may be used to establish secure communication connections between any two entities or components to facilitate subsequent secure information exchanges and is not limited to such connections between a host and a data storage system. Techniques herein may be used in connection with establishing mutual authentication between two entities to facilitate secure information exchanges therebetween. In such an embodiment, a request for information received at one of the entities may only be processed from another entity which has been authenticated.

Figure 3:
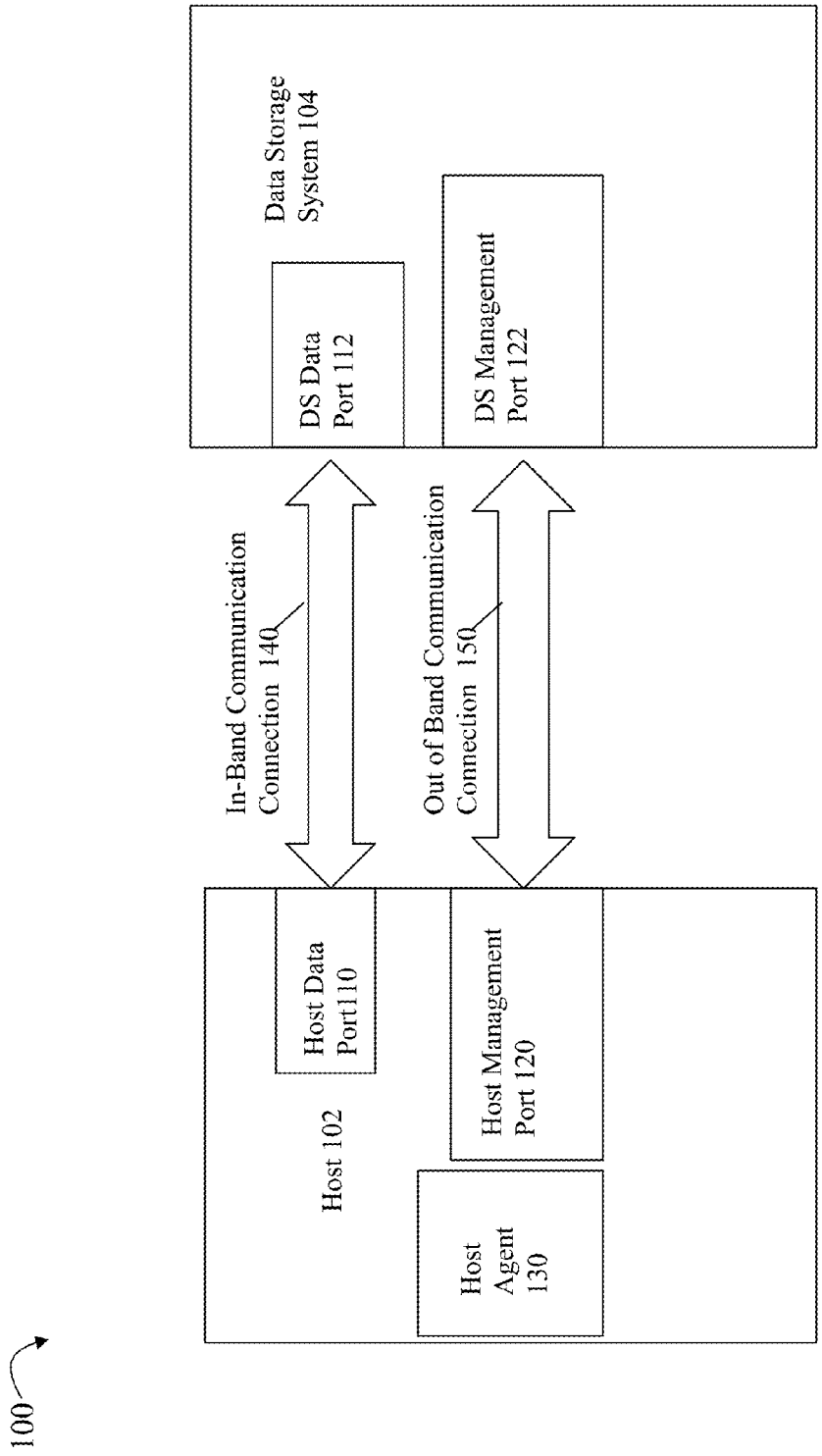
FIG. 3 is an example of a host and data storage system with communication connections therebetween that may be used in an embodiment in accordance with techniques herein.

Referring to FIG. 3, shown is an example illustrating a host and data storage system that may utilize techniques herein. The example 100 includes a host 102 and data storage system 104. The host 102 and data storage system 104 may be as described elsewhere herein such as in connection with FIGS. 1 and 2 with details omitted for simplicity of illustration. Additionally, host agent 130 may be executing on host 130. In an environment such as a SAN environment, the host 102 and data storage system 104 may communicate using two channels or communication connections—the in band communication connection 140 and the out of band communication connection 150. The in band communication connection 140 may be a channel of the data path over which the host 102 may issue I/O or data requests to the data storage system 104. In response to such I/O requests transmitted by the host over connection 140, the data storage system 104 may provide any requested data to the host over the in band connection 140. The in band connection 140 may be, for example, a Fibre channel (e.g., FCoE (Fibre channel over Ethernet)) or iSCSI communication channel. It should be noted that the data path may comprise multiple connections 140 used as in band communication connections over which I/O requests may be issued by the host, and requested data may be returned to the host by the data storage system. An in band communication connection 140 may be between a host data port 110 and a data storage system (DS) data port 112. A host data port 110 may be a port of the host, such as included in a host bus adapter (HBA), used for an in band communication connection of the data path. Similarly, a DS data port 112 may be a port of the data storage system 104 used for an in band communication connection of the data path.

The out of band communication connection 150 may be a channel of the management path over which commands, requests, data, and the like, may be exchanged between the host 102 and the data storage system 104 for data storage management. Such requests sent over the connection 150 (e.g., management path rather than data path) are not I/O requests for user data stored on the data storage system 104. The out of band connection 140 may be, for example, a communication channel of the management IP network. It should be noted that the management path may comprise multiple connections 150 used as out of band communication connections. An out of band communication connection 150 may be between a host management port 120 and a data storage system (DS) management port 122. A host management port 112 may be a port of the host, such as included in a network card having management ports, used for an out of band communication connection of the management path. Similarly, a DS management port 122 may be a port, such as a networking port, of the data storage system 104 used for an out of band communication connection of the management path.

Generally, the in band communication connection 140 of the data path may be characterized as more secure and more trusted relative to the less trusted and less secure out of band connection 150 of the management path. For example, the in band communication connection 140 may be isolated from the management network over which the out of band communication connection 150 is included. The in band communication connection 140 may be included in a closed network which is more physically isolated and less accessible than a general IP network such as the management IP network including connection 150.

In a system such as illustrated in FIG. 3, the out of band connection 150 of the management path IP network may be used by the data storage system to send a request to the host agent 130 for desired information such as described above regarding aspects of how the host 102 uses the storage of the data storage system 104. In such an arrangement, any entity having access to the management IP network may contact the host agent 130 requesting information. In such an embodiment, it may be desirable to establish the out of band connection 150 as a secure connection to facilitate secure transfer of information over the management path (e.g., IP network) such as with requests for information received by the host agent 130. Described in following paragraphs are techniques that may be used to establish the out of band connection 150 as a secure communication connection or channel for information exchanges between the host 102 and data storage system 104. As will be described in following paragraphs, techniques herein may be used to provide a secure out of band communication connection 150 in an automated manner leveraging the more secure in band communication connection 140. Such techniques provide for establishing mutual authentication between a host and a data storage system whereby the host agent of the host, for example, may then subsequently provide the authenticated data storage system with information requested by the authenticated data storage system over the out of band communication connection 150.

Techniques herein utilize certificates or digital certificates which may be any suitable digital certificate known in the art. In cryptography, a digital certificate may be used to identify a particular entity, such as the host 102 or data storage system 104. The certificate may include multiple pieces of information, for example, related to the unique certificate, the entity identified by the certificate (e.g., may identify a name of the entity identified by the certificate), algorithms used in connection with the certificate (e.g., the mathematical algorithm used to compute a hash value which is the certificate fingerprint), and the like. The particular information included in a certificate may vary with embodiment and the standards used.

Techniques herein also use a certificate fingerprint which is a unique number, such as the hash value noted above, associated with a certificate. The number or hash value may be produced by applying a mathematical function or algorithm to the contents of the certificate. If the contents of the certificate change, even by a single character, the function produces a different number or different fingerprint. Certificate fingerprints can therefore be used to verify that certificates have not been modified.

In some embodiments, the certificate may also include a public key bound to the identified entity of the certificate. As known in the art, the public key may be part of a public-private key pair of an asymmetric key encryption scheme whereby anyone can encrypt messages using the public key, but only the holder of the paired private key can decrypt such messages and security depends on the secrecy of the private key. Thus the public-private key pair may be used for encrypting and decrypting information exchanged. For example, if the host has a public key, the data storage system may encrypt messages sent to the host using the public key so that only the host may decrypt such messages using the paired private key. Any message (e.g., text, binary files, or documents) that are encrypted by using the public key can only be decrypted by applying the same algorithm, but by using the matching private key. Any message that is encrypted by using the private key can only be decrypted by using the matching public key.

As described in more detail below, thus, once the host and data storage system exchange certificates that have been authenticated, the public-private key pairing may be used to provide for encrypted, secure information exchanges in accordance with any suitable standard and protocol, such as SSL (Secure Socket Layer) whereby SSL is a protocol that provides for automatically encrypting data exchanged and also provides for mutual authentication whereby the host is authenticated to the data storage system, and the data storage system is authenticated to the host. Such mutual authentication may be performed using techniques described herein.

Techniques herein provide for leveraging the trusted in band communication connection 140 to set up a more secure out of band communication connection 150. Following paragraphs describe processing performed to leverage the trusted in-band connection 140 to exchange some sensitive information (e.g., certificate fingerprints) between the host 102 and data storage system 104, and use the exchanged data to then setup a secure out of band IP network communication connection whereby the out of band communication connection 150 can then be used for secure information exchanges once mutual authentication between 102 and 104 has successfully completed. Prior to performing such processing, the host agent 130 may be running on the host 102. As will be described in more detail below, the general workflow may include a Preparation Phase 1, whereby certificate fingerprints are exchanged between the host 102 and data storage system 104 over the in band communication connection 140. In a second preparation phase, Preparation Phase 2, the secure out of band communication connection 150 is established over the less secure IP management network whereby the host 102 and data storage system 104 exchange certificates such as using standard HTTPS (HTTP with SSL) requests. Using the received data storage system certificate, the host 102 calculates the certificate fingerprint of the data storage system's certificate and determines if the calculated fingerprint matches the previously received fingerprint obtained over the in-band channel 140 during Preparation Phase 1. If yes, then the host may save the data storage system's certificate, such as to a trusted certificate store, for further use in subsequent secure information exchanges. In a similar manner, the data storage system 104 may also perform processing to determine whether a calculated fingerprint for the data storage system matches the previously received host fingerprint obtained over the in band channel 140 during Preparation Phase 1. If yes, then the data storage system may save the host's certificate, such as to a trusted certificate store, for further use in subsequent secure information exchanges.

Once the Preparation Phases 1 and 2 are completed, a subsequent SSL session may be established over the out of band connection 150. In connection with establishing the SSL session over connection 150, mutual authentication may be performed in which the certificates of both the host and data storage system are exchanged over the IP management network out of band connection 150 and verified. Subsequently, information may be exchanged information over connection 150 securely. Processing performed using techniques herein may be performed automatically whereby no human interaction is required.

In connection with techniques herein, the host agent 130 may operate as an HTTPS server with its own certificate and the data storage system 104 may operate as an HTTPS client having its own certificate which requests information from the host agent 130.

Figure 4:
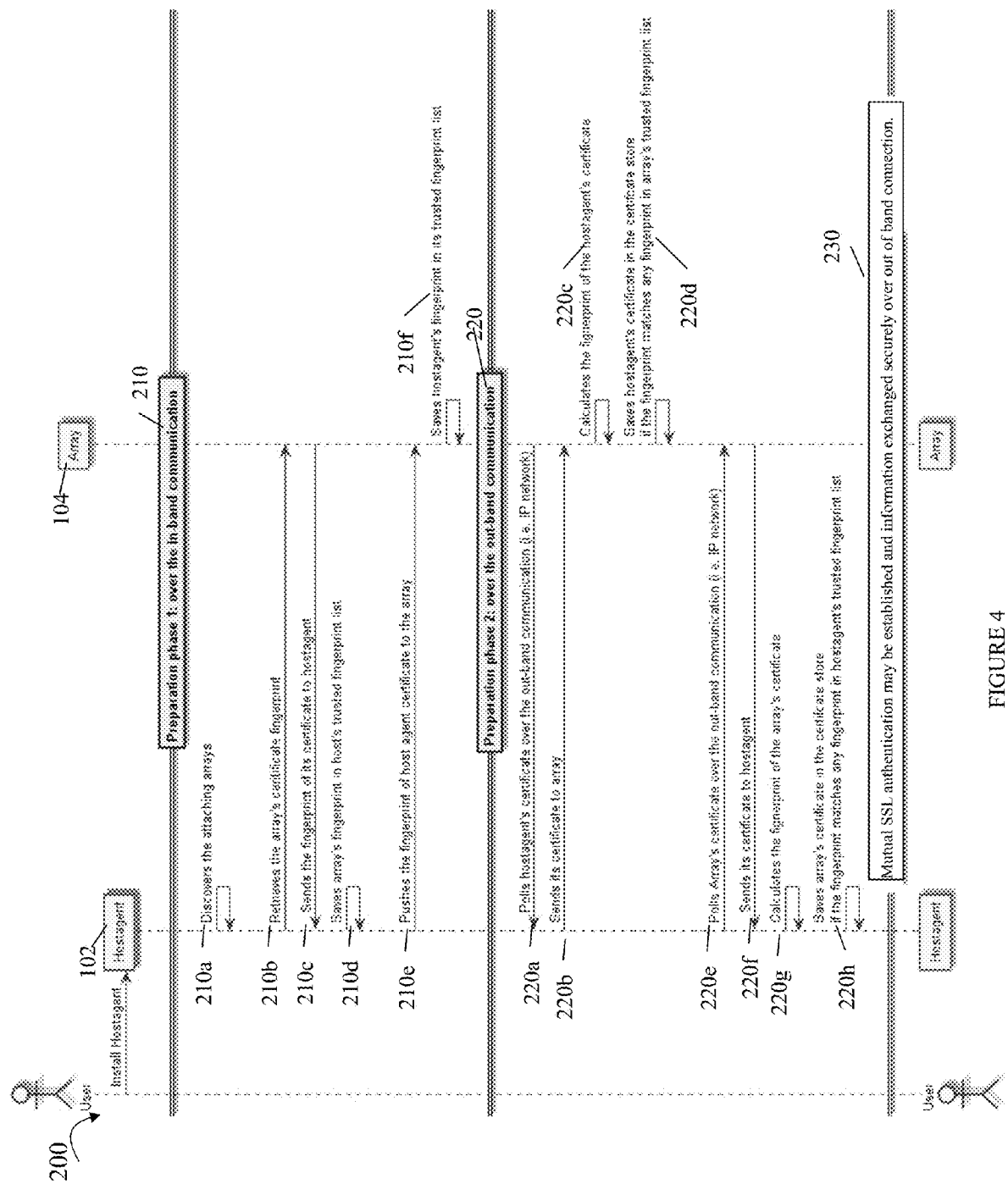
FIG. 4 is an example of a sequence diagram illustrating processing steps that may be performed in an embodiment in accordance with techniques herein.

Referring to FIG. 4, shown is a sequence diagram of processing steps that may be performed in connection Preparation Phase 1 and Preparation Phase 2 to establish the out of band communication connection as a secure communication channel in an embodiment in accordance with techniques herein. The example 200 includes a Preparation Phase 1 210 performed over the in band communication connection. Preparation Phase 1 210 processing may be initiated by the host agent whereby the host agent and data storage system exchange certificate fingerprints. Preparation Phase 1 may include processing illustrated by steps 210a-f. Any commands and information exchanged in Phase 1 utilizes the in band communication connection. In step 210a, the host performs discovery processing which includes the host agent sending commands over the in band connection to discover attached data storage systems. Steps 210b-c illustrate processing performed whereby the host agent pulls the fingerprint of the data storage system's certificate. In step 210b, the host agent issues a request to the data storage system to retrieve the data storage system's certificate fingerprint. In step 210c, the data storage system sends its certificate fingerprint to the host agent. In step 210d, the host agent may save the data storage system's certificate fingerprint in its trusted fingerprint list. Step 210e illustrates processing performed whereby the host agent pushes the fingerprint of its certificate to the data storage system. In step 210f, the data storage system may save the host agent's fingerprint to its trusted fingerprint list. It should be noted that the host agent/host, in step 210 processing, may also provide additional information to the data storage system such as its IP address, name, and the like, so that the data storage system is able to identify the particular host to which it is attaching. In a similar manner, the data storage system may also provide such additional information to the host/host agent, such as in connection with step 210c. It should be noted that the IP address may be used in Preparation Phase 2 for communicating to the host over the out of band connection.

It should be noted that in an embodiment, fingerprints may be exchanged as noted above rather than the actual certificates to reduce the amount/size of data which may be stored such as on the data storage system. For example, on the data storage system, an embodiment may store fingerprint information for each connection from a host initiator to a target port of the data storage system. Depending on the number of connections, allocation and use of memory for storing the certificates rather than fingerprint information may undesirably use an excessive amount of memory and disk space.

Preparation Phase 2 220 may be initiated by the data storage system. In Preparation Phase 2, requests and information exchanged may utilize the out of band communication connection 150. Steps 220a-h provide further detailed steps of Preparation Phase 2 processing. Steps 220a-b illustrate processing performed whereby the data storage system pulls the host agent's certificate. In step 220a, the data storage system sends a request to the host agent for the host agent's certificate. In step 220b, the host agent sends its certificate to the data storage system. In step 220c, the data storage system performs processing to verify or validate the host agent's certificate using the host agent's certificate fingerprint previously provided in Preparation Phase 1 over the in band connection. In step 220c, the data storage system calculates a fingerprint for the certificate received in step 220b. The data storage system may then compare the calculated fingerprint for the host agent's certificate to its list of previously received fingerprints (e.g., fingerprints received during Preparation Phase 1 in step 210e). If the calculated fingerprint is determined to match a previously received fingerprint for a host agent's certificate, then the host agent's certificate received in step 220b has been successfully validated by the data storage system and step 220d may be performed where the host agent's certificate received in step 220b may be stored in a certificate data store of validated or trusted certificates. The data storage system may also associate the host agent certificate received in step 220b with its matching certificate fingerprint (e.g., previously received fingerprint of the data storage system's fingerprint list whereby the previously received fingerprint is determined as matching the received host agent certificate in step 220c).

Steps 220e-f illustrate processing performed whereby the host agent pulls the data storage system's certificate over the out of band communication connection. In step 220e, the host sends a request to the data storage system for its certificate. In step 220f, the data storage system responds by sending its certificate to the host agent.

In step 220g, the host agent calculates a fingerprint for the certificate received in step 220f. The host agent may then compare the calculated fingerprint for the data storage system's certificate to its list of previously received fingerprints (e.g., fingerprints received during Preparation Phase 1 in step 210c). If the calculated fingerprint is determined to match a previously received fingerprint for a data storage system's certificate, then the received data storage system's certificate (received in step 220o has been successfully validated by the host agent and step 220h may be performed where the data storage system's certificate received in step 220f may be stored in a certificate data store of validated or trusted certificates. The host agent may also associate the data storage system's certificate received in step 220f with its matching certificate fingerprint (e.g., previously received fingerprint included in the host agent's fingerprint list whereby the previously received fingerprint is determined as matching the received data storage system certificate in step 220g).

Furthermore, although not explicitly illustrated in FIG. 4, processing may also be performed as part of Preparation Phase 2 to map a validated certificate and associated fingerprint of an identified entity to access information identifying allowable data accesses and/or operations that may be performed by the identified entity. The access information may be represented using, for example, a role or specified set of access permissions (e.g., read-only, read and write, read access for particular data sets) for that entity. Such access information associated with a certificate may be used in an embodiment in determining whether a request that is issued by the entity identified by the certificate is allowable. It should be noted that the foregoing mapping of may be performed dynamically or statically, such as implicitly based on existing rules or policies. In some embodiments, the fingerprint from the above-mentioned mapping may be omitted whereby the mapping is generally from the certificates to the role or access permissions.

Once the Preparation Phase 1 and 2 processing are completed, step 230 may be performed at a subsequent point in time, such as in connection with establishing an SSL session over the out of band communication connection 150 such as to send requested information from the host agent to the data storage system. In step 230 for the SSL session, mutual SSL authentication may be performed using the certificates of the host and data storage system and information may then be securely exchanged over the out of band communication connection 150, such as in accordance with the SSL protocol in this particular example. It should be noted that the particular steps performed for the mutual authentication as well as for exchanging information may vary with the protocol and/or standards used in an embodiment.

Figure 5:
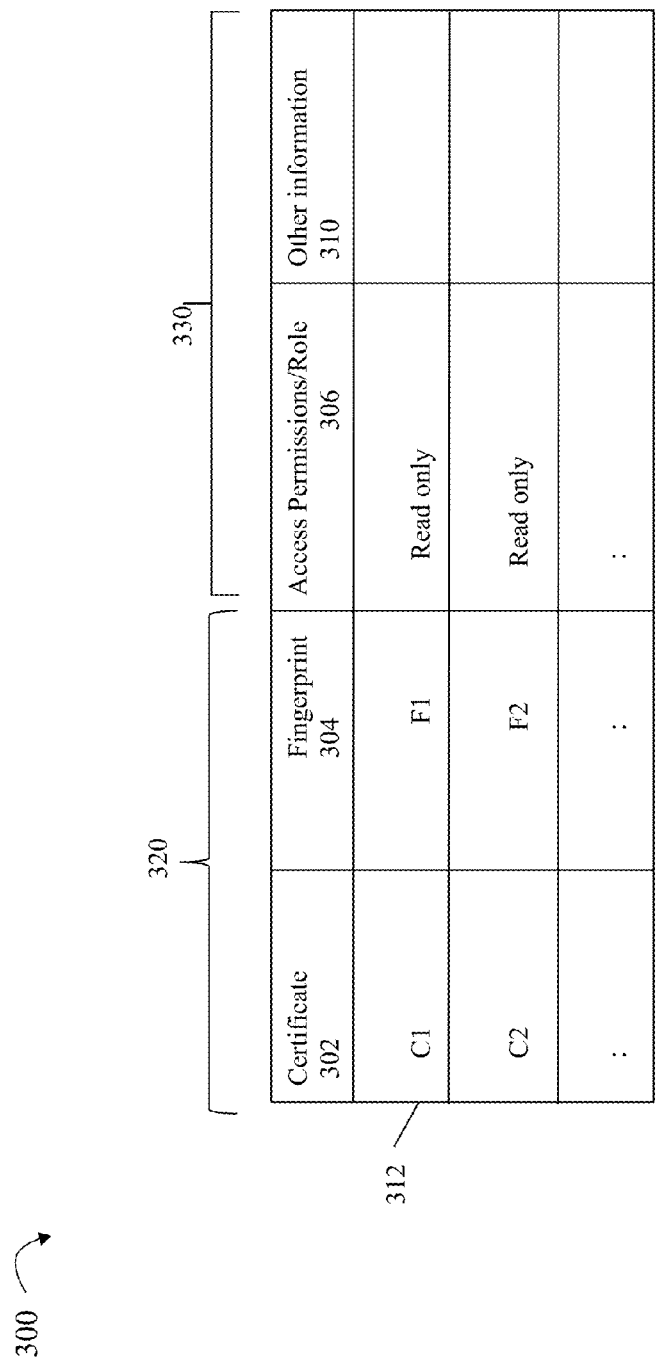
FIG. 5 is an example of information that may be stored and used by each of the hosts and data storage systems in an embodiment in accordance with techniques herein.

Referring to FIG. 5, shown is an example of information that may be used in an embodiment in connection with techniques herein. The example 300 includes a table of information with a row for each validated certificate of a trusted certificate data store. As described elsewhere herein, each of the host and data storage system may use a trusted certificate data store which may include the information 320 as represented in columns 302 and 304. In a given row of 300, column 302 may represent the digital certificate that has been validated and which has a certificate fingerprint included in column 304 of the same row.

The certificate data store used by the host agent may include those certificates received and validated by the host agent in connection Preparation Phase 2 processing of FIG. 4. Similarly, the certificate data store used by the data storage system may include those certificates received and validated by the data storage system in connection Preparation Phase 2 processing of FIG. 4. For a given row of the table in 300, each validated certificate in column 302 may be mapped to a set of one or more access permissions or one or more roles indicated in column 306 of the same row. The access permissions or roles in 306 of a row may identify the allowable permissions or operations that may be performed in connection with a request issued by an entity providing the certificate represented in column 302 of the same row. For example, assume that information in the example 300 is stored on the host agent in connection with validated certificates received by the host agent in connection with Preparation Phase 1 and Phase 2 processing as described in FIG. 4. Row 312 indicates that certificate C1 has been validated and has corresponding fingerprint F1. An entity, such as a data storage system, issuing a request to the host agent may only issue read request for information and may not write or update any information stored by the host agent, or update any configuration on the host (e.g., may not format or modify a LUN of a VMware™ ESX Server). Although not illustrated, the access permissions/roles 306 may indicate the type of operation or access, such as read or write, and may also indicate that such access is applicable to certain types of data or sets of data. For example, the host agent may collect multiple sets of different types of data and it may be that the data storage system having certificate C1 is allowed read access to a first data set, read and write access to a second data set, and no access to a third data set. To further illustrate, the host agent on a host may collect information regarding use of data storage by the host where the data storage may be provided by multiple data storage systems each having their own certificate. Each data storage system may only be allowed access to information collected by the host agent regarding the data storage system's provisioned storage used by the host. For example, the host agent may collect information regarding LUNs used by the host where a first set of LUNs used by the host have storage provisioned in data storage system A and a second set of LUNs used by the host have storage provisioned in data storage system B. Data storage system A may be allowed read access to only data collected pertaining to the first set of LUNs and not the second set of LUNs. Similarly, data storage system B may be allowed read access to only data collected pertaining to the second set of LUNs and not the first set of LUNs.

In connection with implicit assignment of permissions or roles, there may be a default or predetermined set of permissions or role and any certificate received in connection with the Preparation Phase 2 processing as described in FIG. 4 may be assigned the default or predetermined set or permissions or role. Thus, such assignment may be implicit occur without requiring user interaction beyond initially specifying the default or predetermined set. An embodiment may also allow explicit assignment of permissions or roles to each certificate. For example, an administrator may manually specify the permissions or roles for the stored certificates and may vary with certificate. An embodiment may also, for example, use implicit assignment to initially provide permissions or roles for stored certificates. Such default or predetermined permissions or roles may be further modified explicitly, such as by an administrator or through another suitable automated means. The particular permissions or roles may be specified, for example, using one or more authorization rules. Such rules may be provided on each host and data storage system having its own certificate data store.

As also illustrated by the example 300, an embodiment may optionally also associate a validated trusted certificate with other information 310.

Processing of Preparation Phase 1 and Phase 2 such as illustrated in FIG. 4 may be performed, for example, when the storage network components are coming on line/initializing, when a new host is added, and the like. Once Preparation Phase 1 and Phase 2 have been successfully completed at a first point in time, the host and data storage system each have a validated list of certificates identifying validated or verified entities for which requests may be performed and information may be securely exchanged over the out of band communication connection. After successfully completing Preparation Phase 1 and Phase 2 processing as illustrated in FIG. 4 at a first point in time, at a second subsequent point in time in an SSL session, the data storage system 104 may request information from the host agent 102 over the out of band communication connection 150. In connection with establishing such subsequent SSL sessions using an SSL connection over the out of band channel 150, mutual SSL authentication may be performed in accordance with the SSL protocol whereby the host agent and data storage system may exchange certificates, but not fingerprints, and where each performs processing to validate or verify the received certificate as being one of its trusted certificates included in its trusted certificate data store. Thus, using the established data stores of validated trusted certificates on the host agent/host and on the data storage system, mutual SSL authentication may be performed using certificates of the host agent and data storage system in connection with establishing this subsequent SSL session over the out of band communication connection.

To further illustrate, in a subsequent second session, the data storage system may issue a request to the host agent to obtain information about what LUNs are used by the host, any host local logical device name assigned or mapped to a particular LUN, and the like. Processing will now be described with reference to FIG. 6 that may be performed in connection with establishing this subsequent SSL session over out of band connection 150 as a secure SSL connection. Processing of FIG. 6 may be performed for establishing an SSL session after Preparation Phase 1 and Preparation Phase 2 of FIG. 4 have been successfully completed.

At step 402, the data storage system may issue its request to the host agent for information. In step 404, the host agent may provide its certificate to the data storage system. In step 406, the data storage system may perform processing to verify the host agent's certificate. Any suitable technique in accordance with the utilized standard or protocol, such as SLL, may be used to verify the host agent's certificate as being one of the validated certificates included in the data storage system's trusted certificate data store. For example, in step 406, the data storage system may compare the received host agent certificate against trusted certificates in its trusted certificate data store. As described above, the data storage systems' trusted certificate data store includes validated or verified certificates as a result of performing Phase 1 and Phase 2 processing above (e.g., certificates stored by the data storage system in its certificate data store in step 220*d*). Such comparison between a received host agent certificate and certificates in the data storage system's certificate data store may include comparing one or more various attributes, such as a name attribute of the identified entity (e.g., where the particular name or other attribute may be included in a standard), of the certificates to determine corresponding certificates. Once corresponding certificates are determined, processing may then be performed to calculate the fingerprint of the received certificate and compare the calculated fingerprint to that of the corresponding certificate in the data storage system's certificate data store. A successful match or verification of a received certificate with a validated certificate of the data storage system's certificate data store may be determined if the foregoing two fingerprints match. It should be noted that more generally, any suitable technique and criteria may be used to perform step 406 for verifying the received host agent's certificate.

At step 408, a determination is made as to whether the received certificate has been successfully validated or verified. In this example, successful validation or verification may occur if the received certificate matches a trusted certificate in the data storage system's certificate data store as just described. If step 408 evaluates to yes, then the received host agent's certificate has been verified or validated as identifying a known and trusted entity for information exchange and control proceeds to step 412. Otherwise, if there is no match indicating the received certificate is not valid or trusted, step 408 evaluates to no and control proceeds to step 410. If step 408 evaluates to no and control proceeds to step 410, there has been an SSL authentication failure for the current session and the information requested by the data storage system in the step 402 will not be provided by the host agent.

If step 408 evaluates to yes and control proceeds to step 412, in step 412 the data storage system sends its certificate to the host agent. In step 414, the host agent may perform processing to verify the data storage system's received certificate. Processing performed in step 414 by the host agent may be similar to that as described above in connection with step 406 when the data storage system verified the host agent's certificate. In step 414, the host agent may compare the received host agent certificate against trusted certificates in its trusted certificate data store to determine a corresponding certificate in the data store. Such correspondence may be determined, for example, by comparing one or more attributes of the two certificates as described above in connection with step 406. Once a corresponding certificate in the data store has been identified for the received certificate, processing may be performed in step 414 to calculate a fingerprint of the received certificate and then compare the calculated fingerprint to the fingerprint of the corresponding certificate in the host agent's trusted certificate data store. As described above, the host agent's trusted certificate data store includes validated or verified certificates as a result of performing Preparation Phase 1 and Phase 2 processing above (e.g., certificates stored by the host agent in its certificate data store in step 220*h*). A successful match or verification of a received certificate with a validated certificate of the host agent's certificate data store may be determined if the foregoing two fingerprints match.

If the received certificate matches a trusted certificate in the host agent's certificate data store (e.g., such as determined by matching fingerprints), then the received data storage system's certificate has been verified or validated as identifying a known and trusted entity for information exchange. Otherwise, if there is no match, the received certificate is not validated or trusted. Thus, step 416 may be performed to determine whether the host agent successfully verifies or validates the data storage system's certificate. If step 416 evaluates to no, control proceeds to step 418 where it is determined that an SSL authentication failure has occurred for the current session and the data storage system request for information may not be processed. If step 416 evaluates to yes indicating that the host agent successfully verifies the received certificate from the requesting data storage system, step 419 may be performed. At step 419, a determination is made as to whether the request is allowable as indicated by any access permissions or roles specified for the certificate of the data storage system. If step 419 evaluates to no, control proceeds to step 421 where the requested data is not provided to the data storage system since the request is not in accordance with (e.g., not indicated as allowable by) access permissions or roles specified for the requesting data storage system. If step 419 evaluates to yes, control proceeds to step 420 where the host agent sends the requested information to the data storage system.

It should be noted that the information provided from the host agent to the data storage system in step 420 over the out of band channel in response to the request from the data storage system may be encrypted such as, for example, through use of public-private keys or other suitable encryption technique known in the art and as described elsewhere herein. For example, the data storage system may have a public-private key pair where only the private key is known to the data storage system but the public key is made public such as included in the data storage system's certificate. The host agent may encrypt information sent to the data storage system using the data storage system's public key. The data storage system may then decrypt the received encrypted information using its private key (not shared with anyone else). In a similar manner as may be needed, the host agent may have its own public-private key pair whereby only the host agent knows its private key. The data storage system may encrypt information sent to the host agent using the host agent's public key and the host agent may decrypt the encrypted information using its private key.

It should be noted that the particular processing performed, such as to verify or validate digital certificates, providing requested information, and the like, may vary with the particular protocol and standard utilized in an embodiment.

The certificate data store as used by the host agent may be located on the host, another component, may be located on another component managed by a third party provider, and the like. Similarly, the certificate data store as used by the data storage system may be located on the data storage system, another component, may be located on another component managed by a third party provider, and the like. Both the host and data storage system may use the same or different data stores of trusted certificates.

As will be appreciated by those skilled in the art, an embodiment may also use certificate authorities (CAs) for host agent and data storage system certificates. In such an embodiment, the processing of steps 406 and 414 for verification or validation of a received certificate to determine whether such a certificate is trusted may be performed in accordance with suitable known techniques such as, for example, by determining whether the certificate is digitally signed by a trusted CA.

Figure 6:
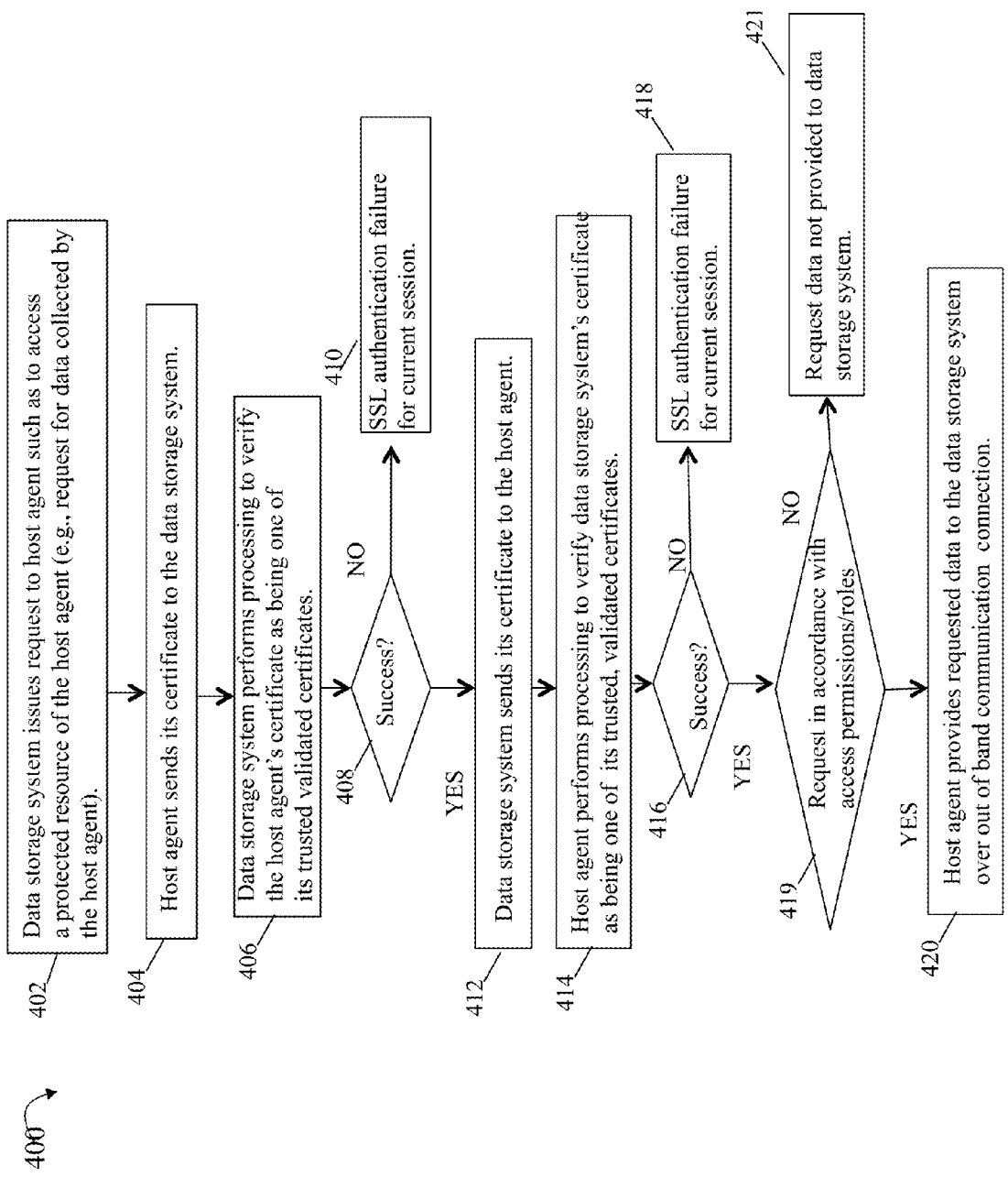
FIG. 6 is a flowchart of processing steps that may be performed in an embodiment in accordance with techniques herein.

In connection with FIG. 6 processing, such as in steps 406 and 414, examples of various criteria and techniques that may be used to verify a received certificate are provided. More generally, such verification criteria used to determine matching validated certificates may include any suitable criteria such as may be defined in accordance with any suitable standard or technique known in the art. Such criteria may be used for determining whether a received certificate matches a trusted certificate in a trusted certificate data store and is therefore verified or validated. The criteria may include, for example, any one or more of: matching one or more various attributes or properties of the certificates such as matching named entities identified by content included in the certificates, determining matching certificate fingerprints, determining that both certificates are properly self-signed by the same correct entity (e.g., with the private key matching the public key included in the certificates), determining that both certificates identify the same entity and are digitally signed by a trusted CA or one or more other acceptable parties, and the like.

As noted above, an embodiment may use certificates which are self-signed or which may be digitally signed by a CA or other third party. In such an embodiment in which digital certificates being verified or validated are signed by a CA, the CA's certificate, as well as digital certificates of any other entities in the certification chain, may be used to perform the verification or validation of steps 406 and 414. For example, in an embodiment in which the certificates of the host agent and data storage system are signed by a CA (e.g. using the CA's private key), the certificates of the host agent and the data storage system may have included or embedded within them the digital certificate of the signing CA and may therefore include the signing CA's public key. During verification or validation of step 406 and 414, the CA's public key may be used to perform the verification or validation. To further illustrate, the signature on a self-signed certificate may be generated with the private key associated with the certificate's subject public key. This is as opposed to a CA signed certificate where the signature for the certificate being signed is generated using the CA's private key. For example, a signature for a host agent certificate may be generated by determining a hash value for the host agent certificate using a mathematical algorithm, such as mentioned above and known in the art. The signature for the host agent certificate may be encrypted by a signing authority such as the CA using the CA's private key. When validating the host agent's certificate which includes the encrypted signature (for the host agent's certificate signed as just described using the CA's private key), validation may include decrypting the received encrypted signature of the host agent's certificate thereby producing a decrypted signature for the host agent certificate, computing the hash value for the host agent's certificate and comparing the computed hash value to the decrypted signature for the host agent certificate. If the comparison indicates that the foregoing two has values match, then the host agent's certificate as signed by the CA is successfully validated. More generally, the foregoing may be performed for validating or verifying a certificate signed by any entity, such as for self-signing (where the host agent's certificate is signed and has a signature produced using the host agent's own private key). In the case of a self-signed certificate, since the signature for the host agent or data storage system's certificate is generated using the host or data storage system's own private key, the foregoing validation may be performed using the public key embedded in the certificate itself for the host agent or data storage system. The foregoing regarding digital certificates, CAs, signed certificates, validation or verification of a signed digital certificate, and the like, are known in the art in accordance with various standards such as described in, for example, RFC 5280, entitled Internet X.509 Public Key Infrastructure Certificate and Certificate Revocation List (CRL) Profile, which may be found, for example, at www.ietf.org/rfc/rfc5280.txt on the internet, which is incorporated by reference herein.

It should be noted that although the out of band communication connection 150 is illustrated in the example herein for providing requested information from the host agent to the data storage system, more generally, the techniques herein may be used to securely exchange information in either direction (e.g., from host/host agent to the data storage system and/or from the data storage system to the host/host agent).

An embodiment may implement the techniques herein using code executed by a processor. For example, an embodiment may implement the techniques herein using code which is executed by a processor. As will be appreciated by those skilled in the art, the code may be stored on a computer-readable storage medium having any one of a variety of different forms including volatile and nonvolatile, removable and non-removable media implemented in any method or technology for storage of information such as computer readable instructions, data structures, program modules or other data. Computer-readable storage media (also referred to as computer readable media or medium) may include, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for using a first secure communication connection between a first component and a second component to establish a second communication connection as another secure communication connection between the first component and the second component, the method comprising:
performing a first phase using the first secure communication connection comprising:
using the first secure communication connection to send, from the first component to the second component, a first fingerprint of a first digital certificate of the first component, said first fingerprint being stored in a list of fingerprints received by the second component over the first secure communication connection; and
using the first secure communication connection to send, from the second component to the first component, a second fingerprint of a second digital certificate of the second component, said second fingerprint being stored in another list of fingerprints received by the first component over the first secure communication connection; and
responsive to completing said first phase using the first secure communication connection, performing a second phase using the second communication connection that is less trusted and less secure than the first secure communication connection, said second phase comprising:
using the second communication connection to send, from the second component to the first component, the second digital certificate;
performing first processing by the first component responsive to receiving the second digital certificate, the first processing including:
determining a calculated fingerprint for the second digital certificate;
determining whether the calculated fingerprint matches any fingerprint of the another list of fingerprints previously received by the first component over the first secure communication connection; and
responsive to determining that the calculated fingerprint matches a fingerprint of the another list, storing the second digital certificate in a first data store for used by the first component;
using the second communication connection to send, from the first component to the second component, the first digital certificate; and
performing second processing by the second component responsive to receiving the first digital certificate, the second processing including:
determining another calculated fingerprint for the first digital certificate;
determining whether the another calculated fingerprint matches a fingerprint of the list of fingerprints previously received by the second component over the first secure communication connection; and
responsive to determining that the another calculated fingerprint matches a fingerprint of the list, storing the first digital certificate in a second data store for used by the second component.

2. The method of claim 1, wherein the first component is any of a host and agent of the host, and the second component is a data storage system.

3. The method of claim 2, wherein the first secure communication connection is an in band communication connection of a data path for transmitting I/O requests from the host to the data storage system and for providing requested host data that is stored on the data storage system to the host.

4. The method of claim 3, wherein the second communication connection is an out of band communication connection of a management path used for management requests between the host and the data storage system.

5. The method of claim 1, wherein after completing said first processing and said second processing, using the second communication connection as the another secure communication connection to exchange information between the first component and the second component.

6. A method for using a first secure communication connection between a first component and a second component to establish a second communication connection as another secure communication connection between the first component and the second component, the method comprising:
using the first secure communication connection to send, from the first component to the second component, a first fingerprint of a first digital certificate of the first component, said first fingerprint being stored in a list of fingerprints received by the second component over the first secure communication connection;
using the first secure communication connection to send, from the second component to the first component, a second fingerprint of a second digital certificate of the second component, said second fingerprint being stored in another list of fingerprints received by the first component over the first secure communication connection;
using the second communication connection to send, from the second component to the first component, the second digital certificate;
performing first processing by the first component, the first processing including:
   determining a calculated fingerprint for the second digital certificate;
   determining whether the calculated fingerprint matches any fingerprint of the another list of fingerprints previously received by the first component over the first secure communication connection; and
   responsive to determining that the calculated fingerprint matches a fingerprint of the another list, storing the second digital certificate in a first data store for used by the first component;
using the second communication connection to send, from the first component to the second component, the first digital certificate; and
performing second processing by the second component, the second processing including:
   determining another calculated fingerprint for the first digital certificate;
   determining whether the another calculated fingerprint matches a fingerprint of the list of fingerprints previously received by the second component over the first secure communication connection; and
   responsive to determining that the another calculated fingerprint matches a fingerprint of the list, storing the first digital certificate in a second data store for used by the second component, wherein the method also includes:
after completing said first processing and said second processing, using the second communication connection as the another secure communication connection to exchange information between the first component and the second component, and wherein after completing said first processing and said second processing, performing third processing comprising:
sending a request for first data from the first component to the second component;
performing mutual authentication processing that includes verifying, by the second component using the second data store, the first digital certificate of the first component and includes verifying, by the first component using the first data store, the second digital certificate of the second component;
determining, using access information associated with the second digital certificate, whether the request for first data by the first component is allowable; and
responsive to determining that the request for first data is allowable, providing, by the second component to the first component, the first data requested.

7. The method of claim 6, wherein the first data is provided to the first component in an encrypted form.

8. A non-transitory computer readable medium comprising code stored thereon that, when executed, performs a method of using a first secure communication connection between a first component and a second component to establish a second communication connection as another secure communication connection between the first component and the second component, the method comprising:
   performing a first phase using the first secure communication connection comprising:
      using the first secure communication connection to send, from the first component to the second component, a first fingerprint of a first digital certificate of the first component, said first fingerprint being stored in a list of fingerprints received by the second component over the first secure communication connection; and
      using the first secure communication connection to send, from the second component to the first component, a second fingerprint of a second digital certificate of the second component, said second fingerprint being stored in another list of fingerprints received by the first component over the first secure communication connection; and
   responsive to completing said first phase using the first secure communication connection, performing a second phase using the second communication connection that is less trusted and less secure than the first secure communication connection, said second phase comprising:
      using the second communication connection to send, from the second component to the first component, the second digital certificate;
      performing first processing by the first component responsive to receiving second digital certificate, the first processing including:
         determining a calculated fingerprint for the second digital certificate;
         determining whether the calculated fingerprint matches any fingerprint of the another list of fingerprints previously received by the first component over the first secure communication connection; and
         responsive to determining that the calculated fingerprint matches a fingerprint of the another list, storing the second digital certificate in a first data store for used by the first component;
      using the second communication connection to send, from the first component to the second component, the first digital certificate; and
      performing second processing by the second component responsive to receiving the first digital certificate, the second processing including:
         determining another calculated fingerprint for the first digital certificate;
         determining whether the another calculated fingerprint matches a fingerprint of the list of fingerprints previously received by the second component over the first secure communication connection; and
         responsive to determining that the another calculated fingerprint matches a fingerprint of the list, storing the first digital certificate in a second data store for used by the second component.

9. The non-transitory computer readable medium of claim 8, wherein the first component is any of a host and agent of the host, and the second component is a data storage system.

10. The non-transitory computer readable medium of claim 9, wherein the first secure communication connection is an in band communication connection of a data path for transmitting I/O requests from the host to the data storage system and for providing requested host data that is stored on the data storage system to the host.

11. The non-transitory computer readable medium of claim 10, wherein the second communication connection is an out of band communication connection of a management path used for management requests between the host and the data storage system.

12. The non-transitory computer readable medium of claim 8, further comprising code that, after completing said first processing and said second processing, uses the second communication connection as the another secure communication connection to exchange information between the first component and the second component.

13. A non-transitory computer readable medium comprising code stored thereon that, when executed, performs a method of using a first secure communication connection between a first component and a second component to establish a second communication connection as another secure communication connection between the first component and the second component, the method comprising:
  using the first secure communication connection to send, from the first component to the second component, a first fingerprint of a first digital certificate of the first component, said first fingerprint being stored in a list of fingerprints received by the second component over the first secure communication connection;
  using the first secure communication connection to send, from the second component to the first component, a second fingerprint of a second digital certificate of the second component, said second fingerprint being stored in another list of fingerprints received by the first component over the first secure communication connection;
  using the second communication connection to send, from the second component to the first component, the second digital certificate;
  performing first processing by the first component, the first processing including:
    determining a calculated fingerprint for the second digital certificate;
    determining whether the calculated fingerprint matches any fingerprint of the another list of fingerprints previously received by the first component over the first secure communication connection; and
    responsive to determining that the calculated fingerprint matches a fingerprint of the another list, storing the second digital certificate in a first data store for used by the first component;
  using the second communication connection to send, from the first component to the second component, the first digital certificate; and
  performing second processing by the second component, the second processing including:
    determining another calculated fingerprint for the first digital certificate;
    determining whether the another calculated fingerprint matches a fingerprint of the list of fingerprints previously received by the second component over the first secure communication connection; and
    responsive to determining that the another calculated fingerprint matches a fingerprint of the list, storing the first digital certificate in a second data store for used by the second component, and wherein the non-transitory computer readable medium further comprises code that, after completing said first processing and said second processing, uses the second communication connection as the another secure communication connection to exchange information between the first component and the second component, and further comprises code that performs third processing after said first processing and said second processing have completed, wherein the third processing further comprises:
    sending a request for first data from the first component to the second component;
    performing mutual authentication processing that includes verifying, by the second component using the second data store, the first digital certificate of the first component and includes verifying, by the first component using the first data store, the second digital certificate of the second component;
    determining, using access information associated with the second digital certificate, whether the request for first data by the first component is allowable; and
    responsive to determining that the request for first data is allowable, providing, by the second component to the first component, the first data requested.

14. The non-transitory computer readable medium of claim 13, wherein the first data is provided to the first component in an encrypted form.

15. A method for secure communication comprising:
  providing a first communication connection between a first component and a second component, said first communication connection being a first secure communication connection providing for securely exchanging information between the first component and the second component, said first component having a first digital certificate with a first fingerprint, said second component having a second digital certificate with a second fingerprint;
  performing first processing to establish a second communication connection as a second secure communication connection between the first component and the second component, wherein said second communication connection is less trusted and less secure than the first communication connection, said first processing including:
    performing a first phase using the first communication connection comprising:
      sending, by the second component to the first component over the first communication connection, the second fingerprint, wherein said first component stores the second fingerprint in a first list of fingerprints received by the first component over the first communication connection; and
      sending, by the first component to the second component over the first communication connection, the first fingerprint wherein said second component stores the first fingerprint in a second list of fingerprints received by the second component over the first communication connection; and
    responsive to completing said first phase using the first communication connection, performing a second phase using the second communication connection comprising:
      sending, by the second component to the first component over the second communication connection, the second digital certificate;
      calculating, by the first component using the second digital certificate received, a a calculated fingerprint;
      determining, by the first component, whether the calculated fingerprint matches any fingerprint in the first list;
      responsive to determining the calculated fingerprint matches a fingerprint in the first list, storing the second digital certificate in a first data store for use by the first component;
      sending, by the first component to the second component over the second communication connection, the first digital certificate;
      calculating, by the second component using the first digital certificate received, a another calculated fingerprint;

determining, by the second component, whether the another calculated fingerprint matches any fingerprint in the second list; and responsive to determining the another calculated fingerprint matches a fingerprint in the second list, storing the first digital certificate in a second data store for use by the second component.

16. The method of claim 15, wherein, prior to performing said first processing, said second communication connection is characterized as providing a lower level of security, in connection with exchanging information between the first component and the second component, than said first communication connection.

17. The method of claim 15, wherein the first component is any of a host and agent of the host, and the second component is a data storage system.

18. The method of claim 17, wherein the first communication connection is an in band communication connection of a data path for transmitting I/O requests from the host to the data storage system and for providing requested host data that is stored on the data storage system to the host.

19. The method of claim 18, wherein the second communication connection is an out of band communication connection of a management path used for management requests between the host and the data storage system.

20. The method of claim 15, wherein after completing said first processing, using the second communication connection as another secure communication connection to exchange information between the first component and the second component.

* * * * *